(12) United States Patent
Foster et al.

(10) Patent No.: US 9,109,917 B2
(45) Date of Patent: Aug. 18, 2015

(54) SYSTEMS AND METHODS FOR PROVIDING INPUT SUGGESTIONS VIA THE HEAD UNIT OF A VEHICLE

(71) Applicant: GOOGLE INC., Mountain View, CA (US)

(72) Inventors: Andrew Foster, Naremburn (AU); Zheng Wang, Arncliffe (AU); Nicholas Julian Pelly, San Francisco, CA (US)

(73) Assignee: GOOGLE INC., Mountain View, CA (US)

( * ) Notice: Subject to any disclaimer, the term of this patent is extended or adjusted under 35 U.S.C. 154(b) by 0 days.

(21) Appl. No.: 14/038,464

(22) Filed: Sep. 26, 2013

(65) Prior Publication Data

US 2015/0088420 A1   Mar. 26, 2015

(51) Int. Cl.
   *G01C 21/36*   (2006.01)
   *G06F 3/16*   (2006.01)
   *G06F 3/048*   (2013.01)

(52) U.S. Cl.
   CPC .............. *G01C 21/362* (2013.01); *G06F 3/048* (2013.01); *G06F 3/167* (2013.01)

(58) Field of Classification Search
   CPC ........ G01C 21/362; G06F 3/167; G06F 3/048
   USPC ................... 701/537; 455/41.3, 456.2; 726/4; 340/995.1
   See application file for complete search history.

(56) References Cited

U.S. PATENT DOCUMENTS

| | | | |
|---|---|---|---|
| 7,406,665 B2 * | 7/2008 | Yokota | 715/826 |
| 7,908,080 B2 | 3/2011 | Rowley et al. | |
| 8,199,111 B2 * | 6/2012 | Aimi et al. | 345/168 |
| 8,326,486 B2 | 12/2012 | Moinzadeh et al. | |
| 8,407,720 B1 | 3/2013 | Chen et al. | |
| 8,745,528 B2 * | 6/2014 | Feldman et al. | 715/804 |
| 8,869,061 B1 * | 10/2014 | Bendig | 715/780 |
| 8,903,651 B2 * | 12/2014 | Homma et al. | 701/427 |
| 8,907,773 B2 * | 12/2014 | Choi | 340/441 |
| 2005/0182563 A1 | 8/2005 | Adamski et al. | |
| 2005/0203698 A1 * | 9/2005 | Lee | 701/200 |
| 2005/0246095 A1 | 11/2005 | Banet et al. | |
| 2006/0271282 A1 * | 11/2006 | Kuroda et al. | 701/208 |
| 2007/0016362 A1 | 1/2007 | Nelson | |

(Continued)

FOREIGN PATENT DOCUMENTS

| | | | |
|---|---|---|---|
| EP | 1406065 A2 * | 4/2004 | |
| JP | 2011249950 A * | 12/2011 | |
| WO | WO-2013/039760 A1 | 3/2013 | |

OTHER PUBLICATIONS

Apple Inc., "AirPlay Overview," (2012).

(Continued)

*Primary Examiner* — Tuan C. To

(74) *Attorney, Agent, or Firm* — Marshall, Gerstein & Borun LLP

(57) ABSTRACT

To assist a driver with requesting navigation data via a head unit of a vehicle, partial user input provided to the head unit is received via a short-range communication link and suggested input corresponding to the partial user input is generated. The partial user input includes a sequence of alphanumeric characters. The suggested input includes the sequence of alphanumeric characters and one or more additional characters and corresponds to a set of one or more geographic locations. The suggested input is provided to the head unit via the short-range communication link.

19 Claims, 13 Drawing Sheets

(56) References Cited

U.S. PATENT DOCUMENTS

| | | | |
|---|---|---|---|
| 2007/0111710 A1 | 5/2007 | Pietruszka et al. | |
| 2007/0210938 A1 | 9/2007 | Deurwaarder et al. | |
| 2007/0255491 A1 | 11/2007 | Geelen et al. | |
| 2009/0171578 A1 | 7/2009 | Kim et al. | |
| 2010/0048184 A1* | 2/2010 | Kim | 455/414.1 |
| 2010/0082242 A1* | 4/2010 | Park | 701/208 |
| 2010/0082243 A1* | 4/2010 | Tran | 701/208 |
| 2011/0038307 A1 | 2/2011 | Madhavan et al. | |
| 2011/0093154 A1 | 4/2011 | Moinzadeh et al. | |
| 2011/0117933 A1* | 5/2011 | Andersson | 455/456.2 |
| 2011/0153209 A1 | 6/2011 | Geelen | |
| 2011/0257973 A1 | 10/2011 | Chutorash et al. | |
| 2011/0298808 A1 | 12/2011 | Rovik | |
| 2012/0110511 A1 | 5/2012 | Howard | |
| 2012/0179325 A1 | 7/2012 | Faenger | |
| 2012/0262379 A1 | 10/2012 | King | |
| 2012/0303263 A1 | 11/2012 | Alam et al. | |
| 2013/0059571 A1 | 3/2013 | King, II et al. | |
| 2013/0100162 A1 | 4/2013 | Iseri | |
| 2013/0124006 A1 | 5/2013 | Anantha et al. | |
| 2013/0138714 A1 | 5/2013 | Ricci | |
| 2013/0143495 A1 | 6/2013 | Ricci | |
| 2013/0143546 A1 | 6/2013 | Ricci | |
| 2013/0143601 A1 | 6/2013 | Ricci | |
| 2013/0166097 A1 | 6/2013 | Ricci | |
| 2013/0167159 A1 | 6/2013 | Ricci et al. | |
| 2013/0238165 A1 | 9/2013 | Garrett et al. | |
| 2013/0274997 A1 | 10/2013 | Chien | |
| 2013/0274998 A1* | 10/2013 | Kato et al. | 701/36 |
| 2013/0275040 A1 | 10/2013 | Dicke | |
| 2013/0297835 A1 | 11/2013 | Cho | |
| 2013/0332631 A1 | 12/2013 | Lee | |
| 2014/0038527 A1 | 2/2014 | Chen | |
| 2014/0120829 A1 | 5/2014 | Bhamidipati et al. | |
| 2014/0179274 A1 | 6/2014 | O'Meara et al. | |
| 2014/0277937 A1 | 9/2014 | Scholz et al. | |
| 2014/0329593 A1* | 11/2014 | Akkarakaran | 463/31 |

OTHER PUBLICATIONS

Apple Inc., "UIWindow Class Reference," (2012).

Brian, "Apple Announces 'iOS in the Car,' Offers Access to Maps, Messages, and More," (2013). Retrieved from the Internet: URL:http://theverge.com/users/m4tt.

Ford Motor Company, "Ford Launches App Developer Program Marking New Course for Customer-Driven Innovation and Value Creation," (2013). Retrieved from the Internet on Sep. 26, 2013: URL:http://corporate.ford.com/news-center/press-release-detail/pr-ford-launches-app-developer-37551?view=print.

Los Angeles Times, "CES: Pioneer Links Smart Phones with Car Navigation Systems," (2011). Retrieved from the Internet on Sep. 26, 2013: URL:http://latimesblogs.latimes.com/technology/2011/01/ces-pioneer-links-smartphones-with-car-navigation-systems.html.

Slash Gear, "Ford SYNC AppLink Adds In-Car Voice Control to Android & BlackBerry Apps," (2010). Retrieved from the Internet on Sep. 26, 2013: URL:http://www.slashgear.com/ford-sync-applink-adds-in-voice-control-to-android-blackberry-apps-2082386/.

Toyota, "Entune® AppSuite: What is Entune® AppSuite?", (2013). Retrieved from the Internet on Sep. 26, 2013: URL:http://www.toyota.com/entune/.

Anandtechvideoreviews, Drive Test: iOS6 Turn by Turn versus Google Maps and Navigation (2012) Retrieved from the Internet at URL:https://www.youtube.com/watch?v=NIFVtwznork.

Aolautos, Mercedes-Benz MBrace 2 Smartphone App Demonstration (2013). Retrieved from the Internet at: URL:https://www.youtube.com/watch?v=EPHS84pLi30.

Bcirce, How to Send a Google Map to Your OnStar Enabled Car, (2014) Retrieved from the Internet at URL:https://www.youtube.com/watch?v=U2zfTL1UcCY.

Myjailbreakmovies, MapsOpener, (2012). Retrieved from the Internet at URL:https://www.youtube.com/watch?v=IFdcpHgx1Sk.

International Search Report and Written Opinion for Application No. PCT/US2014/057484, dated Feb. 6, 2015.

Archos—GamePad—Mapping Buttons. Published on Dec 6, 2012 at <https://www.youtube.com/watch?v=rgsJ7gUK1cA>. Viewed on Mar. 11, 2015.

Car Tech—MirrorLink 1.0 Nov. 28, 2012. Accessed on Feb 18, 2015 https://www.youtube.com/watch?v=4hgO_BcLZVA.

Introducing Mimics—Control your IPhone from a Touch Screen—May 13, 2011. Accessed on Feb. 18, 2015. https://www.youtube.com/watch?v=YcggnNVTNwl.

MirrorLink Car Connectivity Consortium (CCC)—Sep. 29, 2011. Accessed on Feb 18, 2015. http://www.mirrorlink.com/sites/default/files/CCC%20Summit%20Press%20Release_9_29_11.pdf.

MirrorLink In a Technical Nutshell—Nov. 2012. Accessed on Feb 18, 2015. http://www.mirrorlink.com/sites/default/files/docs/Summit%20Template_Jorg%20Brakensiek_English.pdf.

* cited by examiner

SYSTEMS AND METHODS FOR PROVIDING INPUT SUGGESTIONS VIA THE HEAD UNIT OF A VEHICLE

FIELD OF TECHNOLOGY

This application generally relates to providing digital navigation data via a user interface and, more particularly, to providing suggestions related to geographic locations to a head unit of a vehicle.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Today, many car manufacturers offer navigation systems embedded in the head unit, or the "deck," of a vehicle. These embedded vehicle navigation systems typically store collections of static maps and carry out routing and navigation operations locally in the head unit. As the maps and the algorithms implemented in the navigation system become outdated, an update, if supported at all, generally is difficult to carry out. Although some embedded vehicle navigation systems now include a dedicated cellular link for accessing a network server, this link usually requires a costly subscription.

To take advantage of applications running on smartphones and other portable devices, some car manufacturers now offer application programming interfaces (APIs) for accessing audio and visual components of the head unit of a vehicle. These API provide manufacturer-specific schemes for accessing head units. As a result, applications using these APIs generally are developed for only one make or brand of a vehicle.

SUMMARY

An application that invokes an API ("companion application") running on a portable device such as a smartphone receives partial user input, such as first several letters of an address or a name of a business, from the head unit of a car. The companion application receives the partial input from the head unit, using any desired communication scheme, such as a communication scheme defined by the head unit manufacturer. The portable device can receive partial user input via a short-range communication link such as USB, for example. The companion application then invokes the API to allow the companion application to forward partial user input received via the head unit to the navigation service. The navigation service then generates suggested input locally or by requesting suggestions from a suggestions server via a long-range communication link, such as a cellular link. The suggestions can include one or several names or addresses of geographic locations consistent with the suggested input. If desired, the suggestions can be personalized for the user of the portable device. The navigation service can provide these suggestions to the head unit in the form of strings of alphanumeric characters, audio announcements, etc. In some cases, the navigation service converts the suggestions to the format recognized by the head unit. The navigation service in one such implementation includes (i) a navigation service application native to the operating system of the portable device and (ii) an API which a companion can invoke to receive the suggestions, convert the suggestions to the format recognized by the head unit, and provide the suggestions to the head unit.

More particularly, one embodiment of the techniques of the present disclosure is a method in a portable device for providing input suggestions for requesting navigation data via a head unit of a vehicle. The method includes receiving, via a short-range communication link, partial user input provided to the head unit, such that the partial user input includes a sequence of alphanumeric characters. The further includes generating, by one or more processors, suggested input corresponding to the partial user input, where the suggested input includes the sequence of alphanumeric characters and one or more additional characters, and where the suggested input corresponds to a set of one or more geographic locations. The method also includes providing, by the one or more processors, the suggested input to the head unit via the short-range communication link.

Another embodiment of the techniques of the present disclosure is a portable device including one or more processors, a first network interface to communicate with a head unit of a vehicle via a first communication link, a second network interface to communicate with a suggestions server via a second communication link, and a non-transitory computer-readable medium storing instructions. When executed by the one or more processors, the instructions cause the portable device to (i) receive, via the first communication link, partial user input provided to the head unit, (ii) cause the partial user input to be transmitted to the suggestions server, (iii) generate suggested input based on the set of suggestions, and (iv) cause the suggested input to be transmitted to the head unit.

Still another embodiment of the techniques of the present disclosure is a non-transitory computer-readable medium storing instructions that implement an application programming interface (API) for use by a software application executing on a portable device. The API, when invoked by the software application, is configured to (i) receive partial user input from an external device operating independently of the portable device, via a first communication link, (ii) provide the partial user input to a suggestions server via a second communication link, (iii) receive, from the suggestions server, suggested input that corresponds to a set of one or more geographic locations, and (iv) provide the suggested input to the external device.

DETAILED DESCRIPTION

Overview

Figure 1:
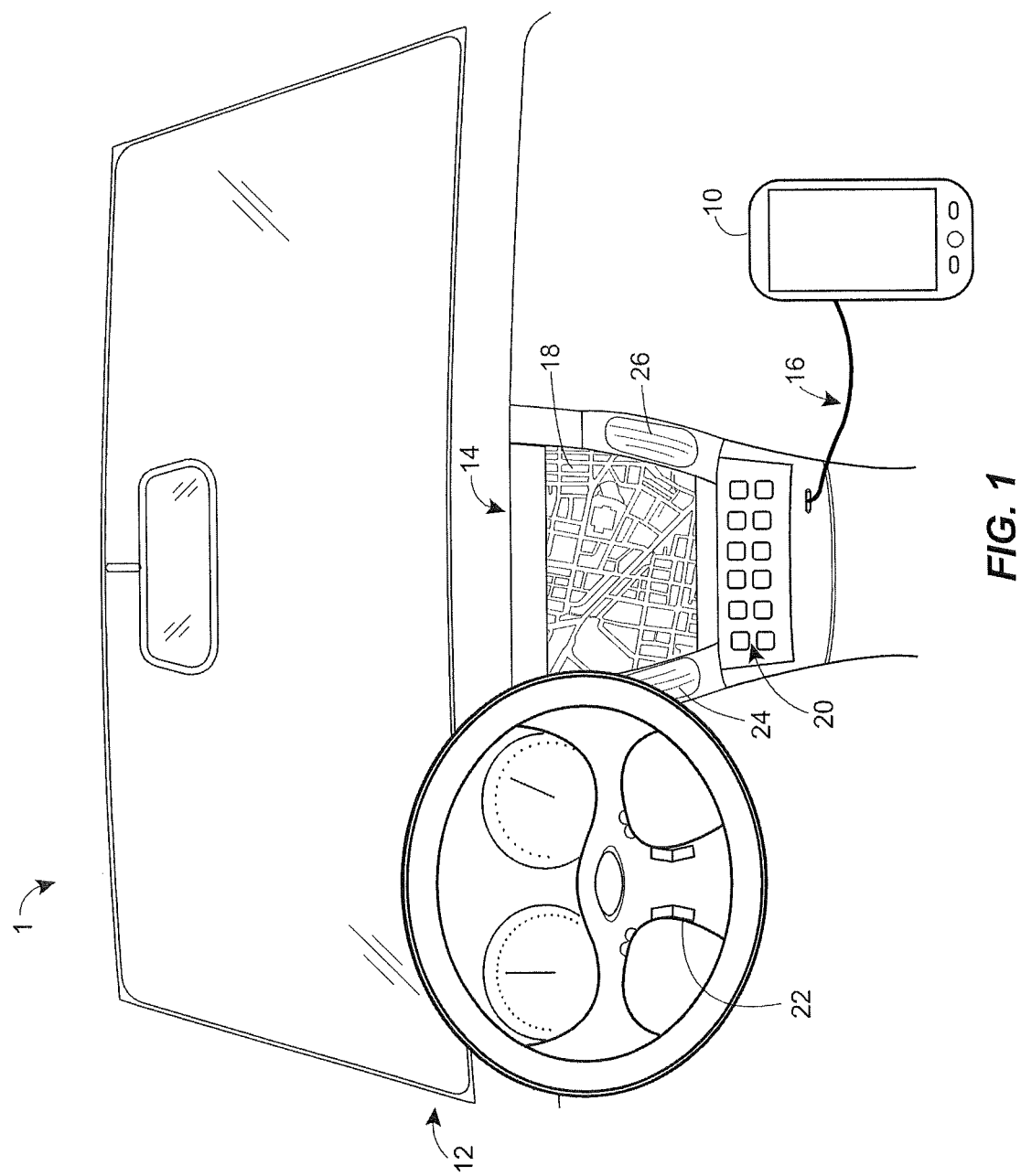
FIG. 1 illustrates an example environment in which the techniques of the present disclosure can be used to transfer navigation data from a portable device to a head unit of a vehicle.

On a portable device, a navigation service exposes a navigation API to allow an application to receive navigation data from a navigation service. The application provides the navigation data to a head unit of a vehicle or another external output system using any desired communication scheme, such as a communication scheme defined by the head unit manufacturer. The navigation API also can allow the application to forward user input received via the head unit to the navigation service. Thus, in a sense, the API provides a two-way interface between the application and the navigation service. Depending on the vehicle, the head unit can include relatively simple components for displaying alphanumeric characters and playing back audio or relatively robust components for displaying digital images and even animation, receiving touchscreen input, receiving and processing voice commands, etc. The portable device, which can be a smartphone, can communicate with the head unit via a short-range communication link such as one that supports a Bluetooth protocol, for example.

As discussed in more detail below, the portable device in an example implementation supports a navigation service application (or simply "navigation application") that communicates with a navigation server via a cellular network or another wireless communication network. The navigation service application can be native to the operating system of the portable device. Using the API, a programmer can develop a "companion" application that runs on the portable device and, on the one hand, communicates with the navigation service and, on the other hand, communicates with the head unit using a communication scheme the head unit supports. As one alternative, the API can implement functionality for directly communicating with the navigation server. As another alternative, the API can communicate with the navigation service application that generates navigation data locally on the portable device without sending requests to the navigation server.

In any case, a car manufacturer can develop a companion application that communicates with the head unit of the car using any desired communication scheme, including a proprietary communication scheme that is not shared with other car manufactures. In general, the navigation API of the present disclosure allows developers to easily and efficiently export navigation data from a portable device in view vehicles as well as retrofit the existing vehicles.

Depending on implementation, the navigation API can include one or several functions, classes, etc. Further, the navigation API can use various data structures, message formats, constants, enumerated lists, etc., and a developer accordingly can be provided with the appropriate definitions. Still further, the navigation API can provide a mechanism for specifying callback functions or otherwise configuring event reporting, messaging, etc. from the navigation service application to the companion application.

In an example scenario, the companion application receives user input from the head unit and invokes the navigation API to provide the user input to the navigation service. The user input can include the name or address of the destination, for example. The navigation service application generates, or receives from a navigation server, a route directing a driver from to the current location to the destination. As one example, the route can include a sequence of steps, each describing a route segment (e.g., name or number of the road, distance, travel time, speed limit) and a maneuver (e.g., left turn, merge right, proceed straight) to access the next route segment. The companion application retrieves the route from the navigation service application via the navigation API, converts the navigation data to the format supported by the head unit, and provides the navigation data to the head unit via a single message or a sequence of messages, for example.

Moreover, the navigation API in some implementations provides a sequence of digital map images to the head unit to illustrate the steps of the route and/or progress of the vehicle. As discussed above, the navigation service application can receive a description of the route from the current location of the portable device to the specified destination. As the portable device moves toward the destination along the route, the navigation service application can request map data for the geographic area in which the portable device is currently located. Using the map data, the portable device can render a digital map image and for each step that illustrates, for example, the geographic area corresponding to the step, the maneuver for transitioning to the step, etc. Further, the portable device and/or the inertial measurement unit (IMU) of the vehicle can determine the current orientation of the vehicle and orient each digital map image so as to match the current orientation of the vehicle. Still further, the navigation API also can provide a personalized digital map image (using information the navigation service application receives form a personalization server). To further personalize digital map images, the head unit also can specify the screen size, styling options, etc., so that the detailed digital map matches the capability of the head unit and, if desired, the design of the car.

According to some implementations, the companion application also maps vehicle controls, such as hardware buttons on the head unit or on the steering wheel, to navigation functions of the navigation service application. More particularly, the user can specify the mapping on the portable device, so that the head unit can simply report key press events to the navigation service application. For example, the companion application can map the volume down button on the steering wheel to the Next Step navigation function for requesting a description of the next step in the route. When the user presses the volume down button on the steering wheel, the head unit transmits a message reporting this event to the companion application. The companion application in turn determines that the volume down button has been mapped to the Next Step function, invokes the navigation API to invoke the function and receive a description of the next step, and provides the description of the next step to the head unit. Because hardware buttons can be configured on the portable device using software, most buttons (and, in some cases, even knobs or slider controls) in many different types of vehicles and head units can be easily configured to work with the navigation API of the present disclosure.

Further, the navigation API in some implementations supports an auto-complete feature that reduces the interaction time with the vehicle controls by generating geographic suggestions based on partial user input via the head unit. As the driver begins to key in a location using the touchscreen in the head unit of the car, for example, the portable device generates a location suggestion and transmits the suggestion to the head unit for display. More specifically, the head unit reports the partial user input (e.g., one or more key press events) to the companion application, which calls the navigation API to provide the partial user input to the navigation service application, which in turn contacts the suggestions server. Once one or suggestions arrive, the navigation service application provides the suggestions to the companion application for forwarding to the head unit. The suggestions also can be personalized if the user configures the navigation service application to access the user's profile when providing suggestions. Thus, for example, when the driver types in the first letter of the destination point (e.g., "M"), the head unit displays a suggested location recently visited by the user that starts with that letter.

Example Environment and System Architecture

Referring to FIG. 1, an example environment 1 in which the techniques outlined above can be implemented includes a portable device 10 and a vehicle 12 with a head unit 14. The portable device 10 may be a smart phone, tablet, wearable computer, etc. The portable device 10 communicates with the head unit 14 of the vehicle 12 via a communication link 16, which may be wired (e.g., Universal Serial Bus (USB)) or wireless (e.g., Bluetooth, Wi-Fi Direct). The portable device 10 also can communicate with various content providers, servers, etc. via a wireless communication network such as a fourth- or third-generation cellular network (4G or 3G, respectively).

In operation, the portable device 10 provides the head unit 14 with information related to navigation, which may include digital map images, text, and audio. The head unit 14 displays this information via a display 18. The display 18 in some implementations is a touchscreen and includes a software keyboard for entering text input, which may include the name or address of a destination, point of origin, etc. Another type of the display 18 can be as a relatively sophisticated screen provided along with a non-touch input device, such as a rotary controller, for example, or a separate touch pad. In general, the display 18 need not be capable of displaying both text and images. A head unit in another vehicle can include, for example, a simple display only capable of displaying alphanumeric characters on one or several lines.

The head unit 14 can include hardware input controls such as buttons, knobs, etc. These controls can be disposed on the head unit 14 or elsewhere in the vehicle 12. For example, the vehicle 12 in FIG. 1 includes navigation controls 20 on the head unit 14 as well as steering wheel controls 22 communicatively coupled to the head unit 14. The controls 20 and 22 can be mapped to a variety of navigation control functions on the portable device 10, as discussed in more detail below. The controls 20 and 22 in some implementations also can be used for entering alphanumeric characters.

The vehicle 12 also can include an audio input and output components such a microphone 24 and speakers 26, for example. Similar to the hardware controls 20 and 22, the microphone 24 and speakers 26 can be disposed directly on the head unit 14 or elsewhere in the vehicle 12.

An example implementation of the portable device 10 and head unit 14 is illustrated with reference to FIG. 2. As discussed above, the head unit 14 includes a display 18, hardware controls 20, 22, an audio input unit 24, and an audio output unit 26. The head unit 14 also can include a processor 25, a set of one or several sensors 28, and one or several short-range communication units 30B.

The set of sensors 28 can include, for example, a global positioning system (GPS) module to determine the current position of the vehicle in which the head unit 14 is installed, an inertial measurement unit (IMU) to measure the speed, acceleration, and current orientation of the vehicle, a barometer to determine the altitude of the vehicle, etc. Although FIG. 2 depicts the set of sensors 28 inside the head unit 14, it is noted that the sensors 28 need not be integral components of the head unit 14. Rather, a vehicle can include any number of sensors in various locations, and the head unit 14 can receive data from these sensors during operation.

A short-range communication units 30B allows the head unit 14 to communicate with the portable device 10. The short-range communication unit 30B may support wired or wireless communications, such as USB, Bluetooth, Wi-Fi Direct, Near Field Communication (NFC), etc.

Depending on the implementation, the processor 25 can be a general-purpose processor that executes instructions stored on a computer-reader memory (not shown) or an application-specific integrated circuit (ASIC) that implements the functionality of the head unit 14. In any case, the processor 25 can operate to format messages from the head unit 14 to the portable device 10, receive and process messages from the portable device 10, display map images via the display 18, play back audio messages via the audio output 26, etc.

Similarly, the portable device 10 can include a short-range communication unit 30A for communicating with the head unit 14. Similar to the unit 3B, the short-range communication unit 30A can support one or more communication schemes such as USB, Bluetooth, Wi-Fi Direct, etc. The portable device 10 also includes one or more processors or CPUs 34, a GPS module 36, a memory 38, and a cellular communication unit 50 to transmit and receive data via a 3G cellular network, a 4G cellular network, or any other suitable network. The portable device 10 also can include additional components such as a graphics processing unit (GPU), for example. In general, the portable device 10 can include additional sensors (e.g., an accelerometer, a gyrometer) or, conversely, the portable device 10 can rely on sensor data supplied by the head unit 14. In one implementation, to improve accuracy during real-time navigation, the portable device 10 relies on the positioning data supplied by the head unit 14 rather than on the output of the GPS module 36.

The memory 38 can store, for example, contacts 40 and other personal data of the user. As illustrated in FIG. 2, the memory also can store instructions of an operating system 42, a companion application 44 that invokes a navigation API 46 during operation, and a navigation service application 48. The software components 42, 44, and 48 can include compiled instructions and/or instructions in any suitable programmable language interpretable at runtime. In any case, the software components 42, 44, and 48 execute on the one or more processors 34.

In some embodiments of the portable device 10, the companion application 44 and the navigation service application 48 are executed as separate processes or tasks. The applications 44 and 48 can communicate using an inter-process communication (IPC) scheme provided by the operating system 42. In one implementation, the navigation service application 48 is provided as a service on the operating system 42 or otherwise as a native component. In another implementation, the navigation service application 48 is an application compatible with the operating system 42 but provided separately from the operating system 42, possibly by a different software provider.

Further, in other embodiments of the portable device 10, the functionality of the navigation service application 48 can be provided as a static library of functions accessible via the navigation API 46. In other words, some or all of functions of the navigation service application 48 can execute as part of the companion application 44. More generally, the navigation API 46 provides, to the companion application 44, access to a navigation service of the portable device 10 using any suitable software architecture and communication schemes, including those currently known in the art.

The navigation API 46 generally can be provided in different versions for different respective operating systems. For example, the maker of the portable device 10 can a Software Development Kit (SDK) including the navigation API 46 for the Android™ platform, another SDK for the iOS™ platform, etc.

As indicated above, a developer who has knowledge of the messaging scheme which the head unit 14 supports, or has sufficient access to the head 14 to expand its functionality, can develop the companion application 44 and access navigation services of the portable device 10 via the navigation API 46. In other words, the navigation service application 48 can provide navigation data to an external device (in this case, the head unit 14) without any modifications to the functionality of navigation service application 48 to match the requirements of the external device.

Figure 3:
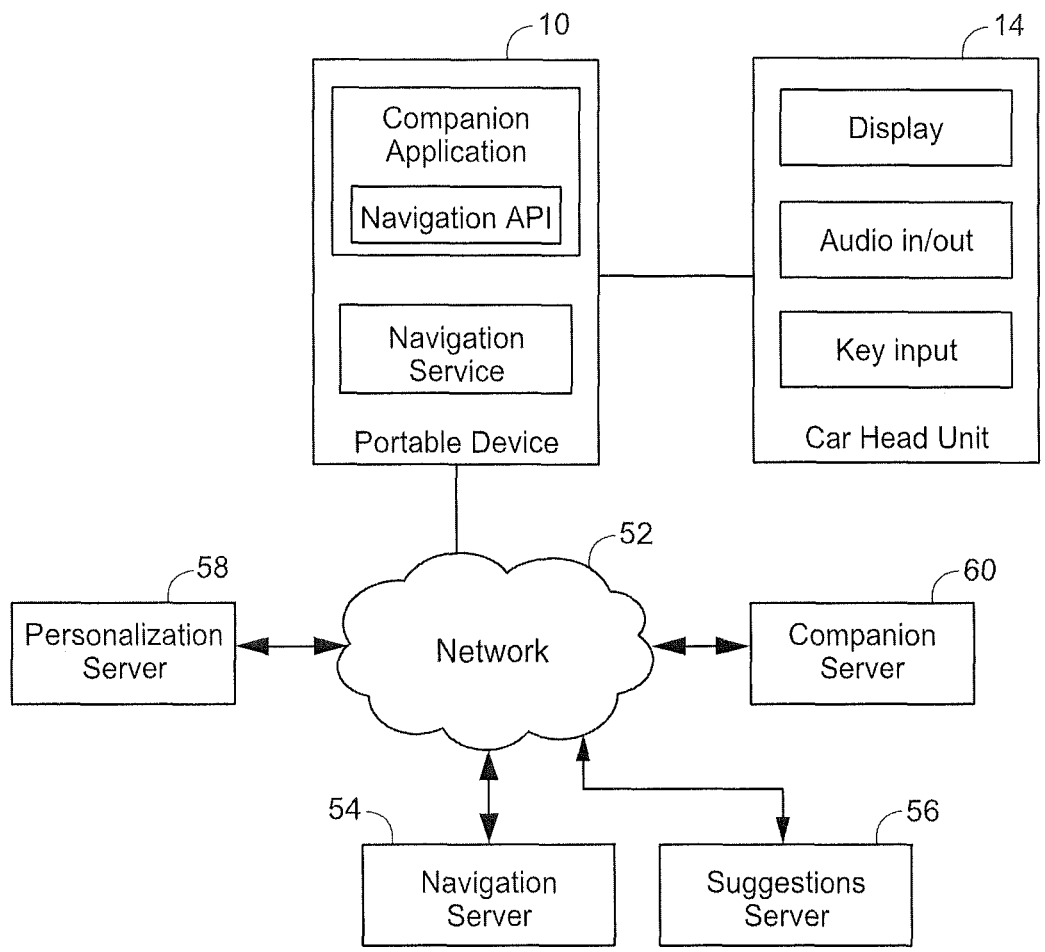
FIG. 3 is a block diagram of an example communication system in which the portable device of FIG. 1 operates.

For further clarity, FIG. 3 illustrates an example communication system in which the portable device 10 can operate to obtain navigation data in response to user requests submitted via the head unit 14. For ease of illustration, the portable device 10 and the head unit 14 are illustrated in FIG. 3 in a simplified manner.

The portable device 10 has access to a wide area communication network 52 such as the Internet via a long-range wireless communication link (e.g., a cellular link) Referring back to FIG. 2, the portable device 10 can access the communication network 52 via a cellular communication unit 50. In the example configuration of FIG. 3, the portable device 10 has access to a navigation server 54 that provides navigation data and map data, a suggestion server 56 that generates suggestions based on partial user input, a personalization server 58 that provides personalization data in accordance with the user's past interactions with the navigation server 54 and other factors.

In some implementations, a companion server 60 formats navigation data directly for use by the head unit 12. In particular, portable device 10 can establish a communication path for navigation data between the head unit 14 and the companion server 60, so that the companion server 60 and/or the navigation server 54 can provide navigation data directly to the head unit 14.

More generally, the portable device 10 can communicate with any number of suitable servers. For example, in another embodiment of the communication network depicted in FIG. 3, the navigation server 54 provides directions and other navigation data while a separate map server provides map data (e.g., in a vector graphics format), a traffic data provides traffic updates along the route, a weather data server provides weather data and/or alerts, etc.

Providing Navigation Data to a Head Unit of a Vehicle

According to an example scenario, a driver requests navigation information by pressing appropriate buttons on the head unit of the user's vehicle and entering the destination. The head unit provides the request to the portable device, which in turn requests and receives navigation data from a navigation server. The portable device then provides the navigation data to the head unit for display and/or audio playback.

Figure 4:
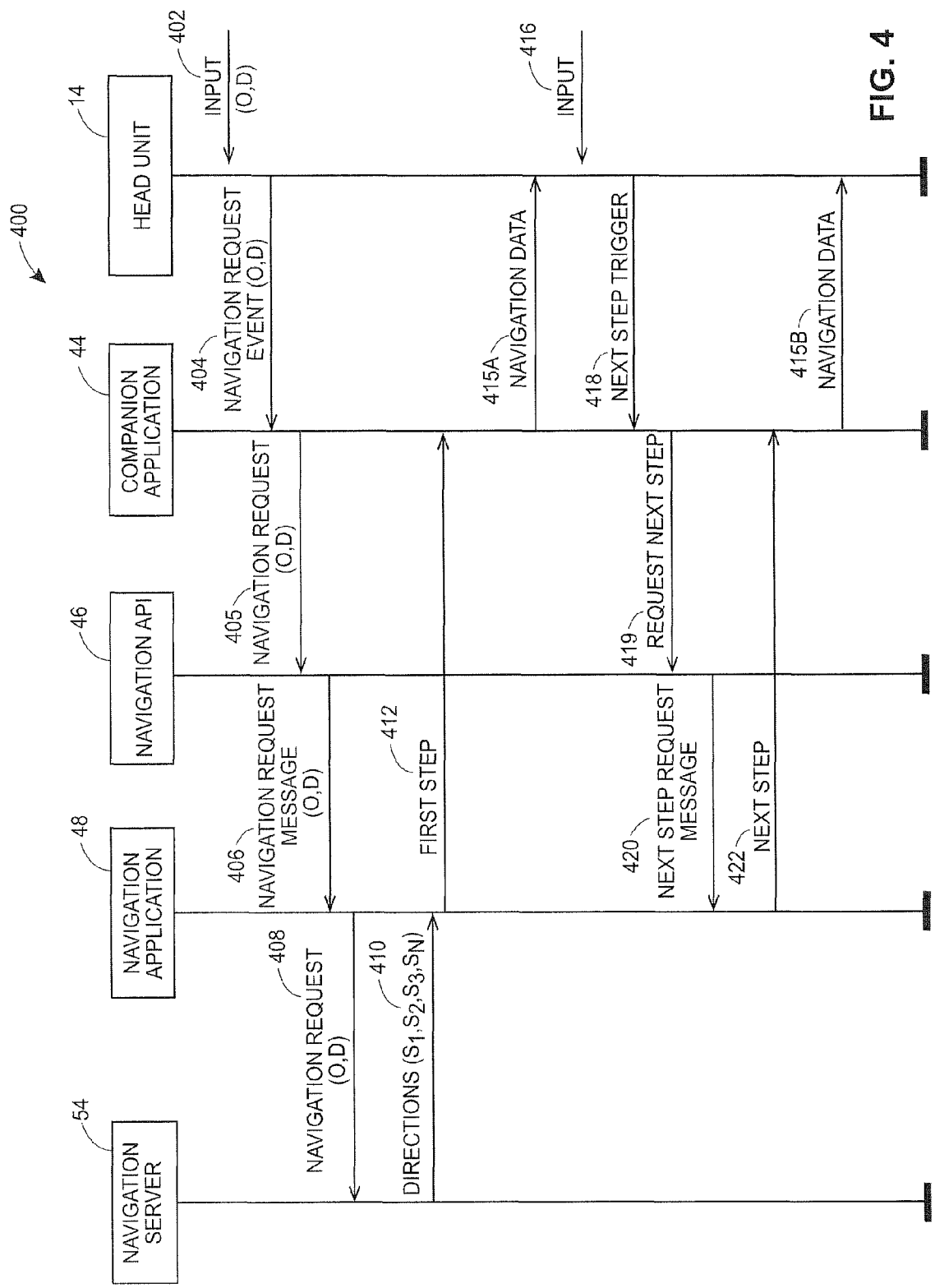
FIG. 4 is a message sequence diagram that illustrates an example exchange of information between the components illustrated in FIG. 2 to provide navigation data to the head unit in response to user input provided via the head unit.

For further clarity, a message sequence diagram of this scenario (400) is depicted in FIG. 4. Each vertical line schematically represents the timeline of the corresponding component, with events depicted lower on the page occurring after the events depicted higher on the page. The flow of information between the components is represented by arrows. An arrow in different situations can represent a message propagated between different physical devices, a message propagated between tasks running on the same device, a function call from one software layer to another software layer, a callback function invoked in response to a triggering event, etc. Further, a single arrow in some cases can represent a sequence of function calls and/or messages.

A user submits input (402) that includes the destination (D), such as "233 South Wacker Dr." to the head unit 14. The user also may specify the origin (O), or the head unit 14 can automatically associate the current location with the origin. Depending on the hardware and software available in the head unit 14, the user can submit the input 402 using buttons, knobs, voice, touchscreen, etc. The head unit 14 processes the user input and transmits a navigation request event 404 to the companion application 44 running on the portable device 12. If desired, the navigation request event 404 can be a message that conforms to a proprietary communication protocol specified for communications between the head unit 14 and devices external to the head unit 14. Referring back to FIGS. 1 and 2, the head unit 14 can transmit the navigation request event 404 over the short-range communication link 16.

The companion application 44 receives the navigation request event 404 and invokes the navigation API 46. More specifically, the navigation request event 404 generates a navigation request 405 in accordance with the format of the API 46. As part of generating the navigation request 405, the companion application 44 can invoke a function to specify the destination, a function to specify the preferred manner of reporting navigation events (e.g., upcoming turn, on-route progress confirmation), a function to configure the use of sensors (e.g., use GPS readings of the head unit 14 or of the portable device 10, use the IMU readings of the vehicle 12), etc. Each of these functions can have a syntax and a list of parameters specific to the navigation API 46. Additionally or alternatively to invoking functions with API-specific prototypes, the companion application 44 can populate data structures exposed by the navigation 46.

In a sense, the companion application 44 translates the request to guide the user to a certain destination from the format of the head unit 14 to the format of the navigation API 46 and, more generally, of the navigation service available on the portable device 10. The navigation service thus need not support multiple protocols for communicating with head units of various car manufacturers.

Prior to forwarding the request from the companion application 44 to the navigation service application 48, the navigation API 46 in some implementations conducts authentication of the companion application 44. More particularly, the navigation API 46 determines whether the companion application 44 is authorized to request navigation data from the navigation service of the portable device 10. The navigation API 46 can receive an authentication key and request that the authentication key be verified by an authentication server (not shown in FIGS. 1-3), for example.

Next, the navigation API 46 notifies the navigation service application 48 of the request via a navigation request message 406. To this end, any suitable IPC scheme can be used (or, if the components 46 and 48 operate within the same task, an intra-process communication scheme or any other suitable notification mechanism).

The navigation service application 48 then formats and transmits a navigation request 408 to the navigation server 54 via a long-range wireless communication link and ultimately via a wireless communication network, such as the network 52 discussed with reference to FIG. 3. Generally speaking, the navigation request 408 can be similar to a navigation request which the navigation service application 48 transmits to the navigation server 54 when the user invokes navigation functions directly via the portable device 10. In other words, the portable device 10 and the head unit 14 in some implementations can be presented to the navigation server 54 as a single node. In some implementations, the navigation request 408 conforms to a proprietary protocol defined by the operator of the navigation server 54 (so as to make communications between the navigation server 54 and client devices more efficient and reduce the probability of unauthorized access).

In response to the navigation request 408, the navigation server 54 provides directions 410. In the example of FIG. 4, the directions 410 include data describing a sequence of N steps $S_1, S_2, \ldots S_N$. A description of each step can indicate a route segment and a maneuver for transitioning to the next route segment. The directions 410 also can include an estimated time of arrival, time and/or distance to the destination, time and/or distance to the next route segment (for each step), a description of current traffic conditions, etc. The navigation server 54 transmits the directions 410 to the navigation service application 48 in the form of a message or a sequence of messages via the long-range communication link. For ease of illustration, FIG. 4 depicts the directions 410 as a single message transmitted to the navigation application 48 only at the beginning of the navigation session. However, the navigation application 48 and the navigation server 54 according to other implementations can exchange additional information, such as route updates and corrections, later during the navigation session as the portable device 10 makes progress toward the destination.

With continued reference to FIG. 4, the navigation service application 48 receives the direction 410 and provides the first step $S_1$ to the companion application 44 in the form of a message 412, which may be a callback function previously set up by the companion application 44, for example. The navigation service application 48 in general can forward data to the companion application 44 via the navigation API 46.

In a typical scenario, the message 412 includes text made up of alphanumeric characters. However, the navigation service application 48 in some cases may generate an audio announcement based on the description of the step and provide the audio announcement in a digital format (e.g., WAV, MP3) to the companion application 44. Alternatively, the conversion from text to audio can be implemented in the companion application 44. Further, a description of a step of navigation directions can include a digital map image, as discussed in more detail below with reference to FIGS. 6-8.

In any case, the companion application 44 converts the received description of the first step $S_1$ to the format supported by the head unit 14 and transmits a navigation data message 415A to the head unit 14 via the short-range communication link. The head unit 14 can provide the first information to the driver in any suitable manner (e.g., display, audio playback).

The driver in the example scenario of FIG. 4 presses a certain key on the steering wheel (or actuates another control) to request a description of the next of the directions. After the head input detects input event 416, the head unit 14 transmits a next step trigger notification 418 to the companion application 44, which in turn invokes the navigation API 46 to submit a request for the next step 419. The navigation API 46 transmits a next step request message 410 to the navigation service application 48. Similar to the description 412 discussed above, the navigation application 48 provide a description of the next step (422) to the companion application 44 for format conversion and forwarding to the head unit 14 in the form of a navigation data message 415B. The scenario may continue in this manner until the user reaches the destination or cancels the navigation session, for example.

In another implementation, the head unit 14 generates the next step trigger message 418 automatically upon analyzing the current position of the vehicle 12. In another implementation, the navigation application 48 automatically generates the description of the next step 422 in response to detecting that the portable device 10 approaches the point at which the driver has to make a maneuver to stay on route. In yet another implementation, the navigation application 48 provides all the steps of the directions to the head unit 14 at once upon receiving the directions 410 from the navigation server 54, provided the head unit 14 is capable of storing the entire sequence of steps.

Figure 5:
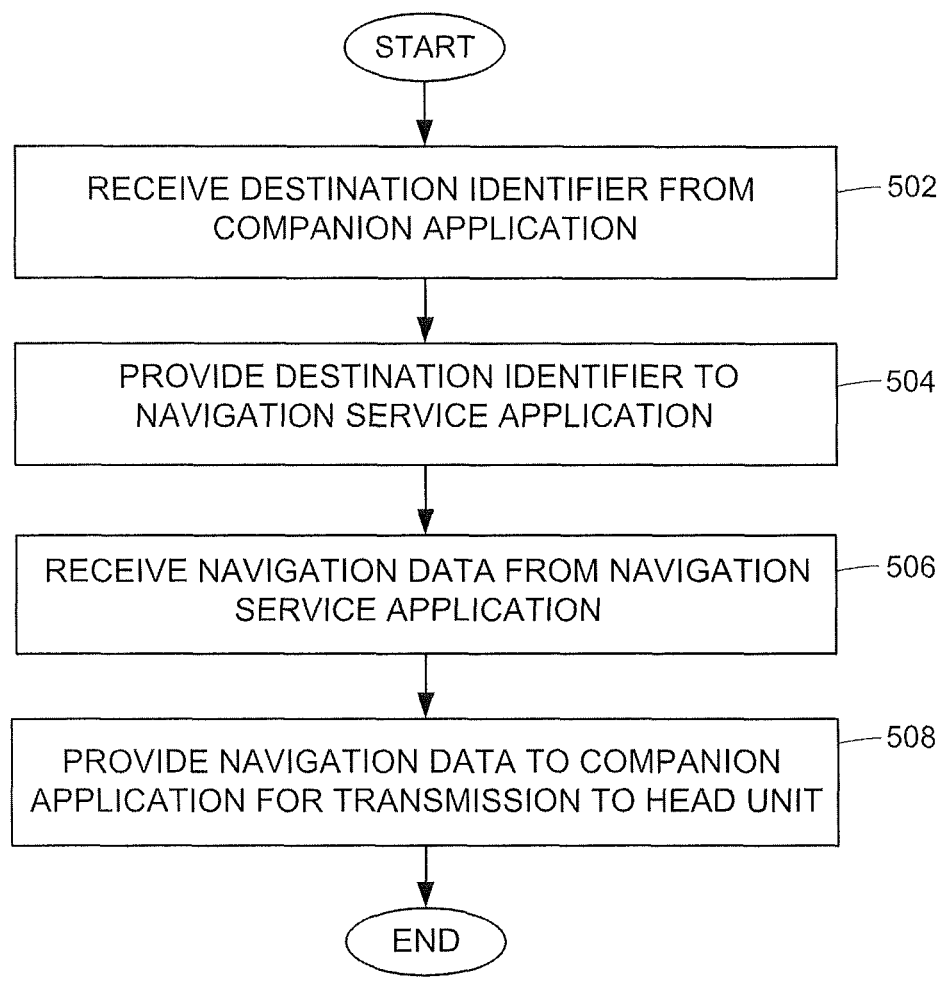
FIG. 5 is a flow diagram of an example method for receiving navigation data from a navigation server and providing the navigation data to a head unit of a vehicle, which can be implemented in the API of FIG. 2.

Now referring to FIG. 5, an example method 500 implements some of the functionality of a navigation API (e.g., the navigation API 46). The method 500 can be a set of instructions stored on a computer-readable memory and executable on one or more processors of the portable device 10, for example.

The method begins at block 502, where an identifier of the destination is received from the companion application. The identifier can include a complete address (e.g., "233 South Wacker Drive, Chicago, Ill., USA") or a geospatial search term (e.g., "Sears Tower in Chicago"), for example. Next, at block 504, the identifier of the destination is provided to a software component via which the navigation services of the portable devices are accessible. For example, the identifier can be provided to the navigation service application 48 discussed above.

At block 506, the navigation data is received from the navigation service application 48 or otherwise from the navigation service of the portable device. At block 508, the navigation data is provided to the companion application for transmission to the head unit 14 via a short range communication link. The method completes after block 508.

In some implementations, the navigation service application communicates directly with the head unit without using a companion application. More particularly, the navigation service application and the head unit can exchange messages that conform to a data format defined specifically for communicating navigation data and related information between the navigation service application and head units of vehicles. This data format can be an open format shared with a number of vehicle manufacturers. Because there is no need to transmit navigation data to the head unit in a format specific to the head unit or the vehicle, the navigation service application can simply convert navigation data to messages conforming to the open format and transmit these messages via the short-range communication link. The navigation service application in this case need not execute instructions specific to the head unit (e.g., invoke an API which the manufacturer of the vehicle and/or the head unit provides). Moreover, other than for optional personalization, the navigation service application need not know any specific parameters of the head unit to be able to transmit navigation data to the head unit. The navigation service application can be native to the operating system of the portable device.

Providing Digital Map Images to a Head Unit of a Vehicle

As discussed above, the navigation service application 48 receives the requested directions as a series of steps describing a route. Each step includes one or more maneuvers, (e.g., "turn left at Main St.," "proceed through the intersection," "merge onto Route 66"). In some implementations, the head unit 14 also receives a digital map image for a maneuver. The digital map image can be oriented to match the current orientation of the vehicle, so that the top of the map corresponds to the direction the vehicle is current facing rather than True North. Further, the digital map image can be personalized to include one or more locations associated with the user's account, such as a business or another point of interest (PO) the user has previously visited. Still further, the digital map image can be personalized to match the style of the head unit.

As one alternative to these techniques, the portable device 10 can continuously export images to the head unit 14 as the digital map is re-rendered in accordance with the new position of the portable device 10. In other words, the graphics content rendered on the portable device 10 can be "mirrored" to the portable device 10. However, the mirroring approach requires a large amount of bandwidth, quickly drains the battery on the portable device 10, and requires that the head unit 14 be capable of displaying a quick succession of images.

Figure 6:
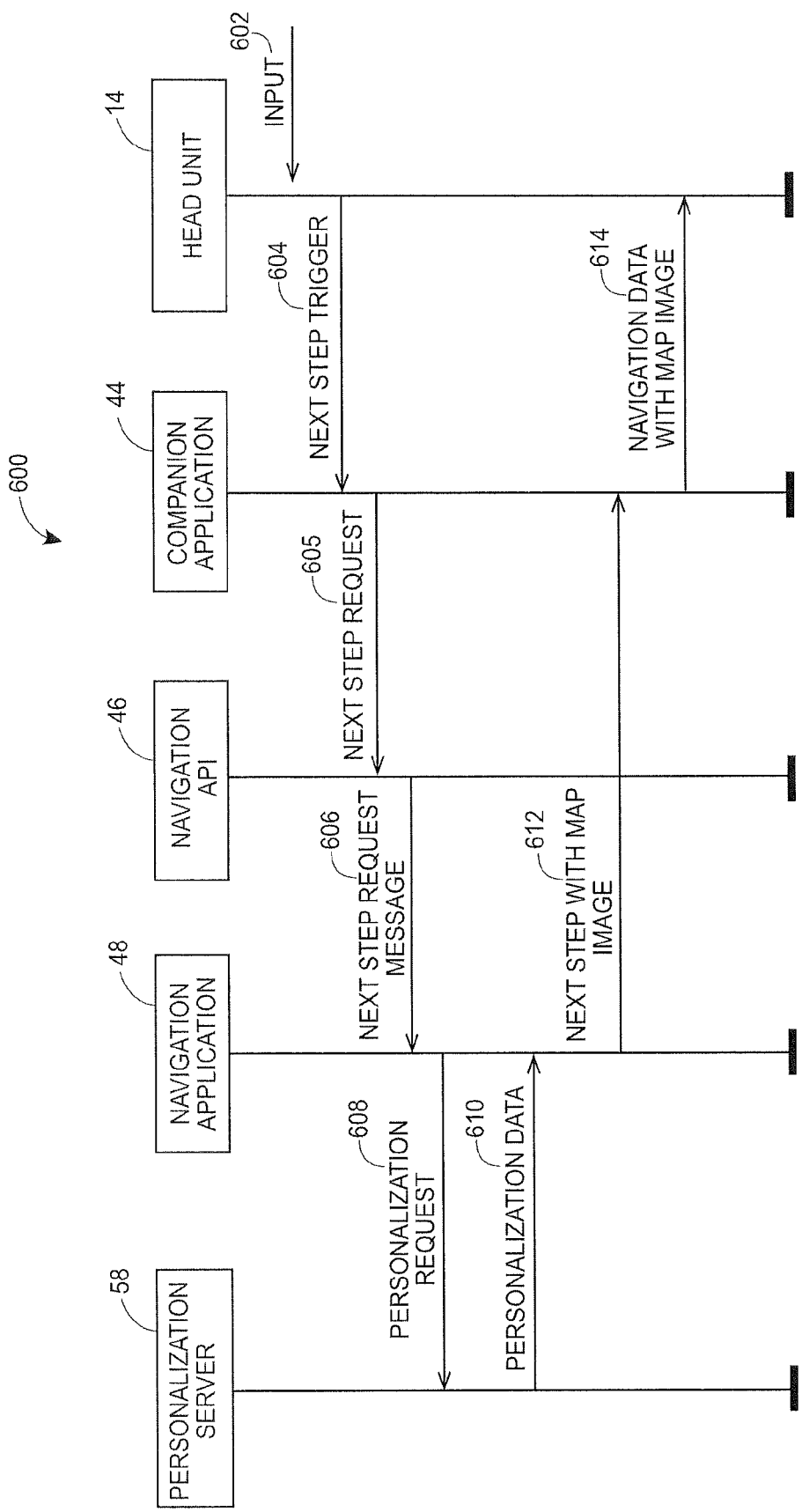
FIG. 6 is a message sequence diagram that illustrates an example exchange of information between the components illustrated in FIG. 2 to provide a digital map image corresponding to a maneuver to the head unit.

According to an example scenario 600 of FIG. 6, an input event 602 is generated when the user actuates a control to indicate that she wishes to see and/or hear the instructions for the next step of the route. For example, the input 602 can correspond to the input event 416, and the techniques illustrated in FIG. 6 accordingly can be implemented in the scenario of FIG. 4.

In response to the input event 602, the head unit 14 transmits a next step trigger event (604) to the companion application 44 via the short-range communication link. The companion application 44 then invokes the navigation API 46, which may include converting the next step trigger event 604 into a data structure and/or a function call recognized by the navigation API 46. The navigation API 46 notifies the navigation application 48 via a next step request message 606.

In this example scenario, before providing a description of the next step to the companion application 44 (see message 422 in FIG. 4), the navigation service application 48 queries the personalization server 58 regarding the user's preferences (personalization request 608), receives personalization data 610 in response, and generates a digital map image for the maneuver for display via the head unit 14. In general, the navigation service application 48 need not contact a personalization server, and the navigation service application 48 in some implementations generates the digital map image with no personalization.

When generating digital map images, the navigation service application 48 can operate on a set of map elements defined in a vector graphics format, for example. Generally speaking, a vector graphics format is based on mathematical descriptions of geometric shapes. The navigation service application 48 can receive map data that specifies various map elements such as roads, buildings, bodies of water, parks, etc., for various geographic regions. The map data also can include alphanumeric labels and, in some cases, already-rasterized images (i.e., images defined in a bitmap format). The navigation service application 48 can interpret vector-based definitions of map elements to generate raster images in a standard format (e.g., JPEG) in the desired orientation.

The personalization data 610 can include such information as, for example, an indication of which places along the route should be displayed more prominently for the user (e.g., coffee shops), an indication of which places the user previously visited, an indication of how familiar the user is with a certain part of the route (so that, for example, fewer directions are provided for a frequently visited part of the route, and more directions are provided for a part of the route with which the user is not very familiar), etc. The navigation service application 48 can generate a digital map image in view of the personalization data 610.

Further, the navigation service application 48 can adjust the visual attributes of the map image, such as the color scheme, line thickness, fonts used in labels, etc. in view of the parameters of the head unit 602. Thus, the companion application 44 can invoke a function of the navigation API 46 to specify the size of the screen available at the head unit 14, the resolution, the preferred color scheme, etc. In this manner, the companion application 44 can configure the navigation application 48 to generate map images that match the overall style of the interior of the vehicle.

As also indicated above, the navigation service application 48 can generate each map image with an orientation that matches the direction the vehicle is currently facing. In one example implementation, the companion application 44 receives an indication of the current orientation from the head unit 14 and provides this indication to the navigation service application 48 via the navigation API 46. Alternatively, the navigation service application 48 and/or the navigation API 46 can use the sensors in the portable device 10. The map image which the navigation service application 48 generates for display via the head unit 14 can be in any suitable format such as BMP, JPEG, etc.

The navigation service application 48 provides the next step data along with the map image to the companion application 55 (next step with map image message 612), which in turn provides this data to the head unit 14 (navigation data with map data message 614).

Figure 7:
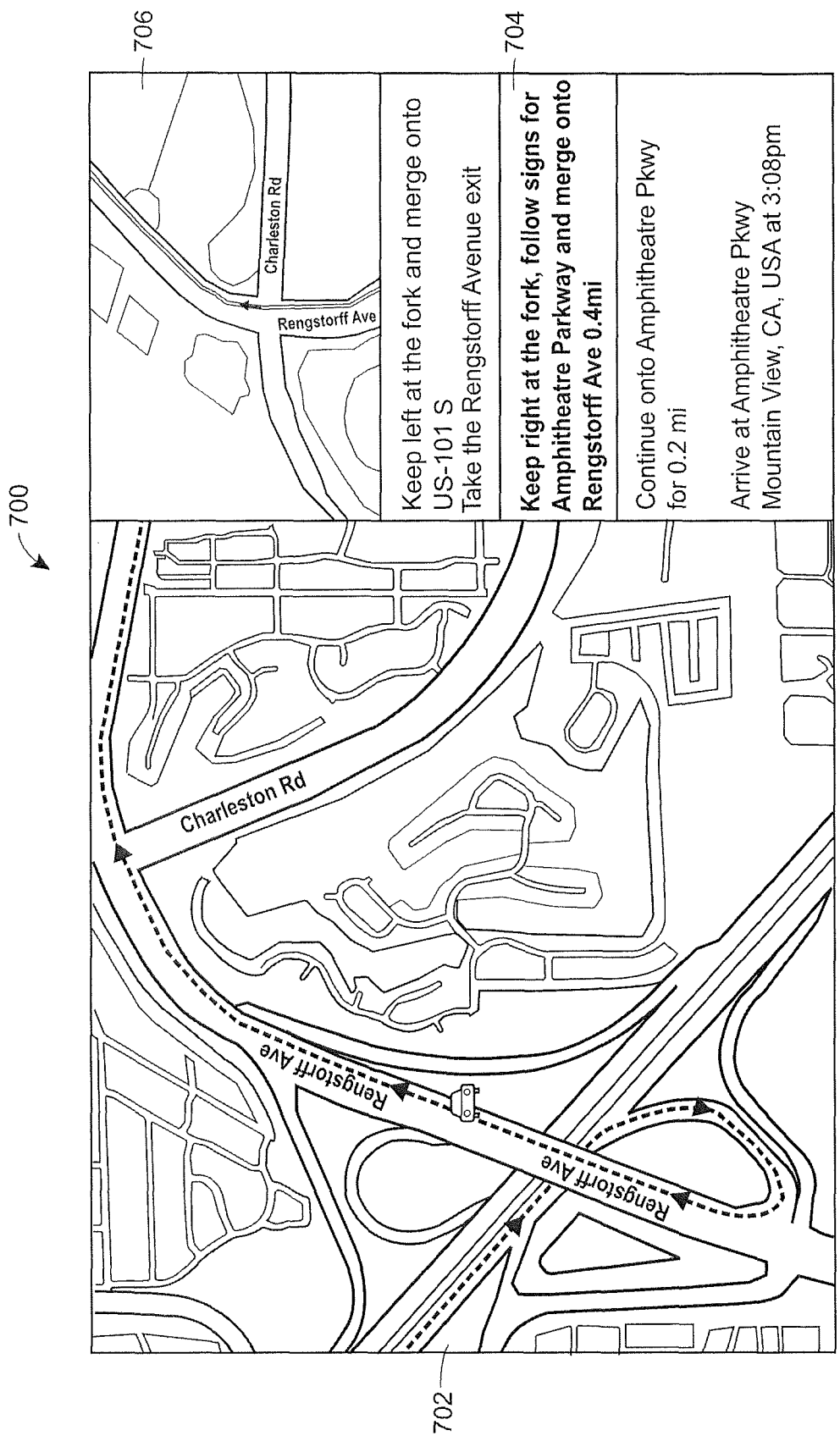
FIG. 7 is an example image that can be displayed on a head unit using the techniques of the present disclosure.

Turning briefly to FIG. 7, an example viewport 700 on the display of the head unit 14 is illustrated. The viewport 700 displays a digital map 702, a step description area 704 and a detailed digital map region 706. The head unit 14 can generate the viewport 700 using the data requested and received as discussed with reference to FIG. 6.

As illustrated in FIG. 7, the digital map 702 is augmented with one or more locations associated with a user account, for example a restaurant that the user frequents, etc. Including familiar landmarks in a digital map typically allows the user to better visualize and understand the maneuver presented on the detailed digital map.

Figure 8:
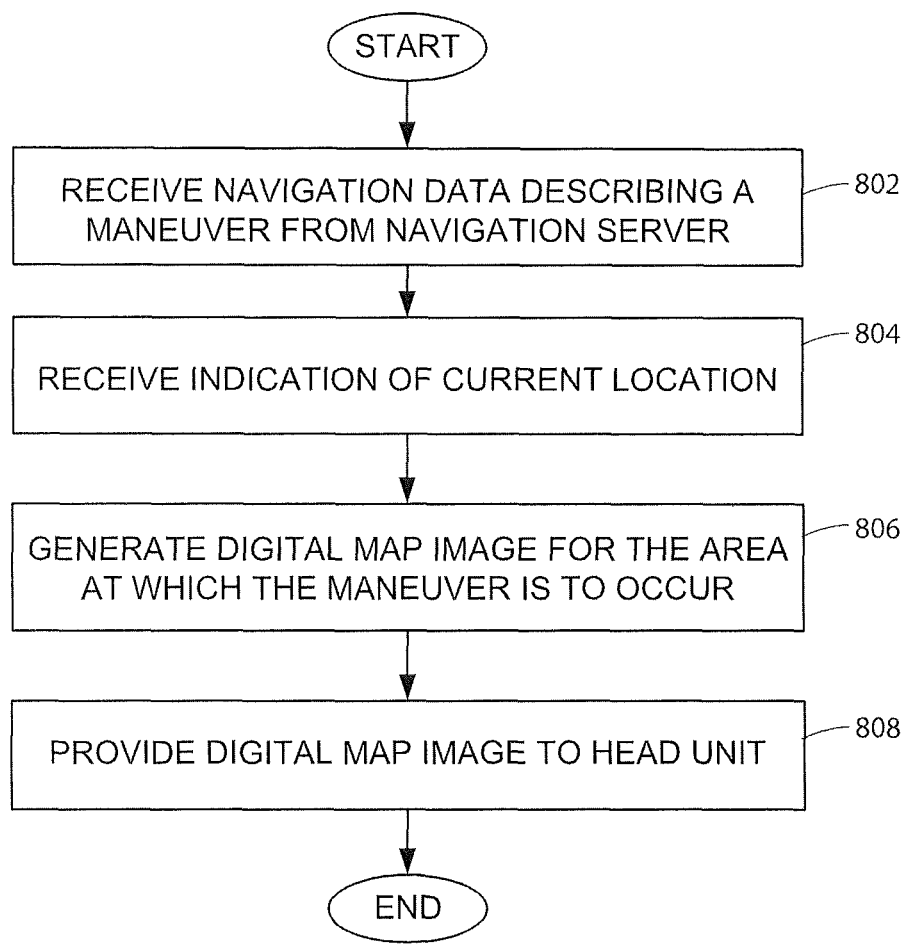
FIG. 8 is a flow diagram of an example method for generating a digital map image for a maneuver and providing the digital map image to vehicle head unit of a vehicle, which can be implemented in the API of FIG. 2.

For additional clarity, an example method 800 for providing navigation data with digital map images to the head unit of a vehicle is discussed with reference to FIG. 8. The method 800 can be implemented as a set of computer-executable instructions, stored in a computer readable memory, and executed on one or several processors. As one example, the method 800 can be implemented in the navigation API 46, but in general the method 800 can be implemented in a portable device or in any suitable computing device.

The method begins at block 802, where navigation data specifying a maneuver is received from the navigation server. Next, at block 804, an indication of a current location of a vehicle 12 is received. In some embodiments, the orientation of the vehicle 12 is also be received at block 804. At block 806, a digital map is generated for the geographic area that includes the location at which the maneuver takes place. The digital map image may be oriented in accordance with the current orientation of the vehicle 12 and, in some cases, personalized as discussed above. At block 808, the digital map is provided to the head unit 14 of the vehicle 12 via a communication link. The method completes after block 810.

Configuring and Mapping Vehicle Controls

In some cases, the navigation service on the portable device 10 can be used to map the existing vehicle controls in the vehicle 12, such as the navigation buttons and the steering wheel buttons, to navigation functions of the navigation service application 48. The user configures the mapping on the portable device 10, so that the head unit 14 can simply report key press events to the navigation service application 48. For example, many vehicles have buttons on the steering wheel, radio, head unit 14, etc. for volume up, volume down, next track, previous track, etc. The companion application 44 can support a configuration feature that enables users to map vehicle controls to various navigation functions. Once the mapping is completed, the navigation service application 48 executes various actions, such as provide the next step in the route, return to a previous step in the route, etc. in response to the user actuating vehicle controls. Because the buttons can be configured on the portable device 10 using software, the head unit 14 can be easily configured and even retrofitted.

Figure 2:
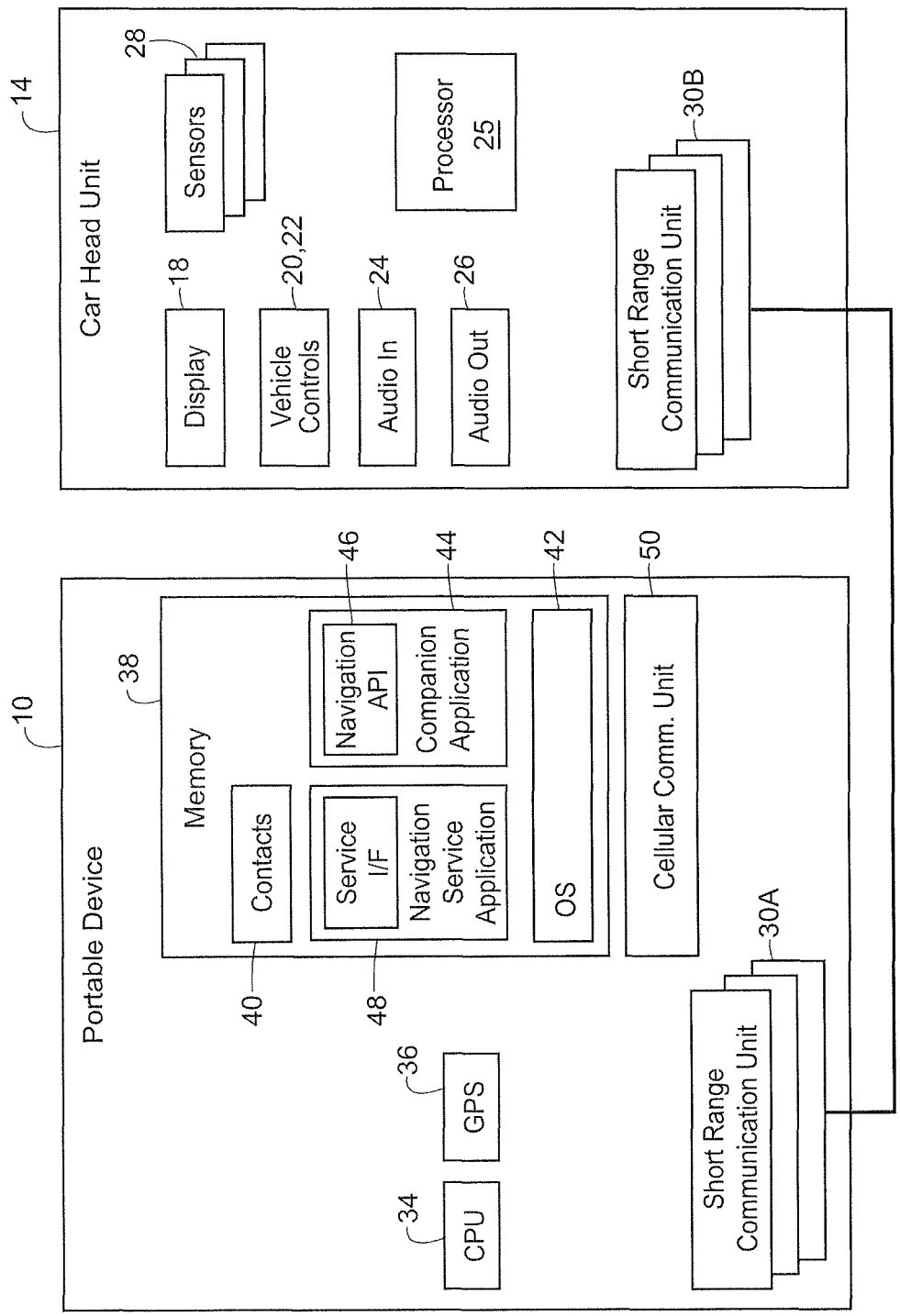
FIG. 2 is a block diagram of an example portable device and an example head unit that can operate in the system of FIG. 1.
Figure 9:
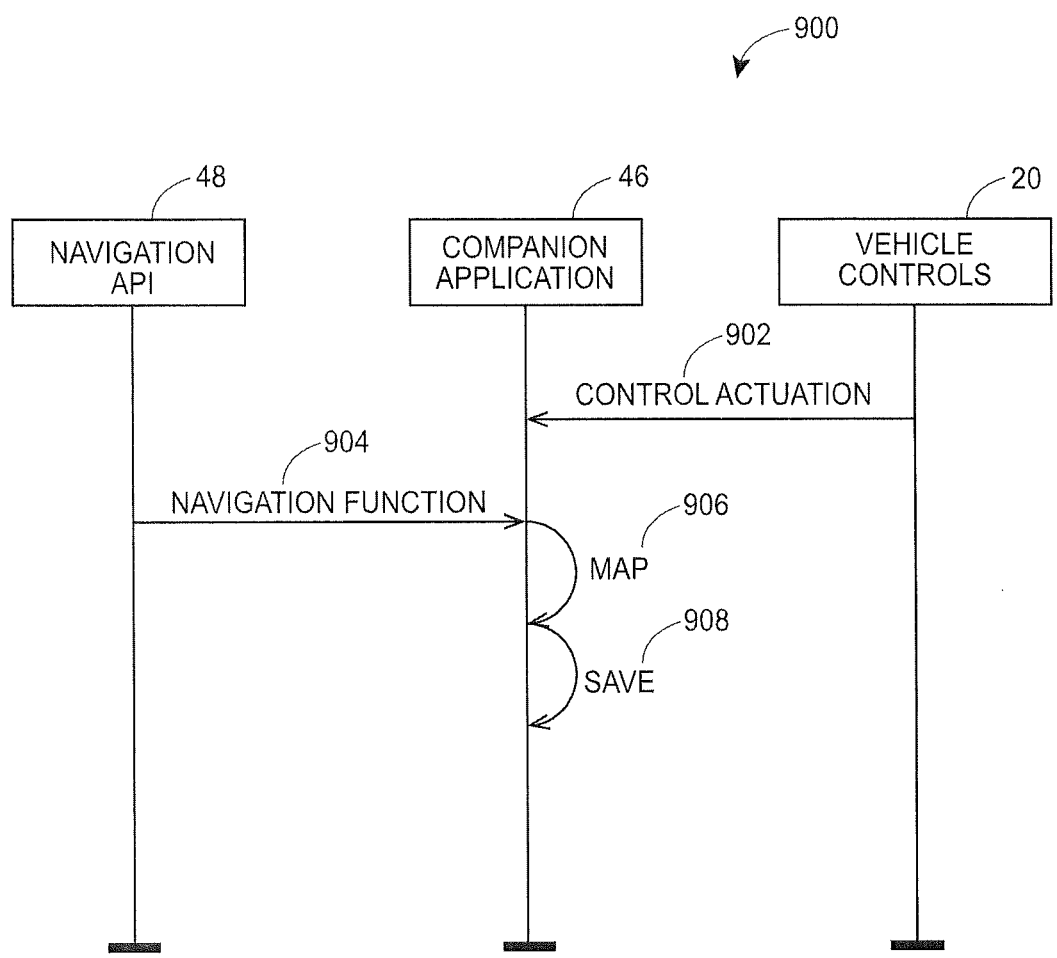
FIG. 9 is a message sequence diagram that illustrates an example exchange of information between the components illustrated in FIG. 2 to map hardware controls on the head unit to navigation functions on the portable device.

FIG. 9 is a message sequence diagram that illustrates an example exchange of information 900 between the components illustrated in FIG. 2 to map hardware controls on the head unit 14 to navigation functions on the portable device 10.

After the user actuates a vehicle control, such as the navigation buttons 20 and/or steering wheel button 22 (see FIG. 1), the companion application 46 receives a control actuation event 902. For example, the control actuation event 902 can indicate that the user pressed the "next track" button on the steering wheel. At the same time, the companion application 46 can present a user interface screen on the portable device 10, via which the user can select various navigation functions and specify the mapping. The user selects a navigation function (e.g., next step) via the companion application 46. Optionally, the companion application 46 obtains parameters and other information about the navigation function via the navigation API 48 (message 904 in FIG. 9).

Once the companion application 46 receives both an indication of which vehicle control was actuated and an indication of which navigation was selected, the companion application 46 creates a mapping between the vehicle control and the navigation function (action 906) and saves the mapping in the persistent memory of the portable device 10 (action 908). In a similar manner, the companion application 46 can receive a mapping for multiple navigation functions and multiple vehicle controls. If desired, more than one vehicle control can be mapped to a same navigation function.

Figure 10:
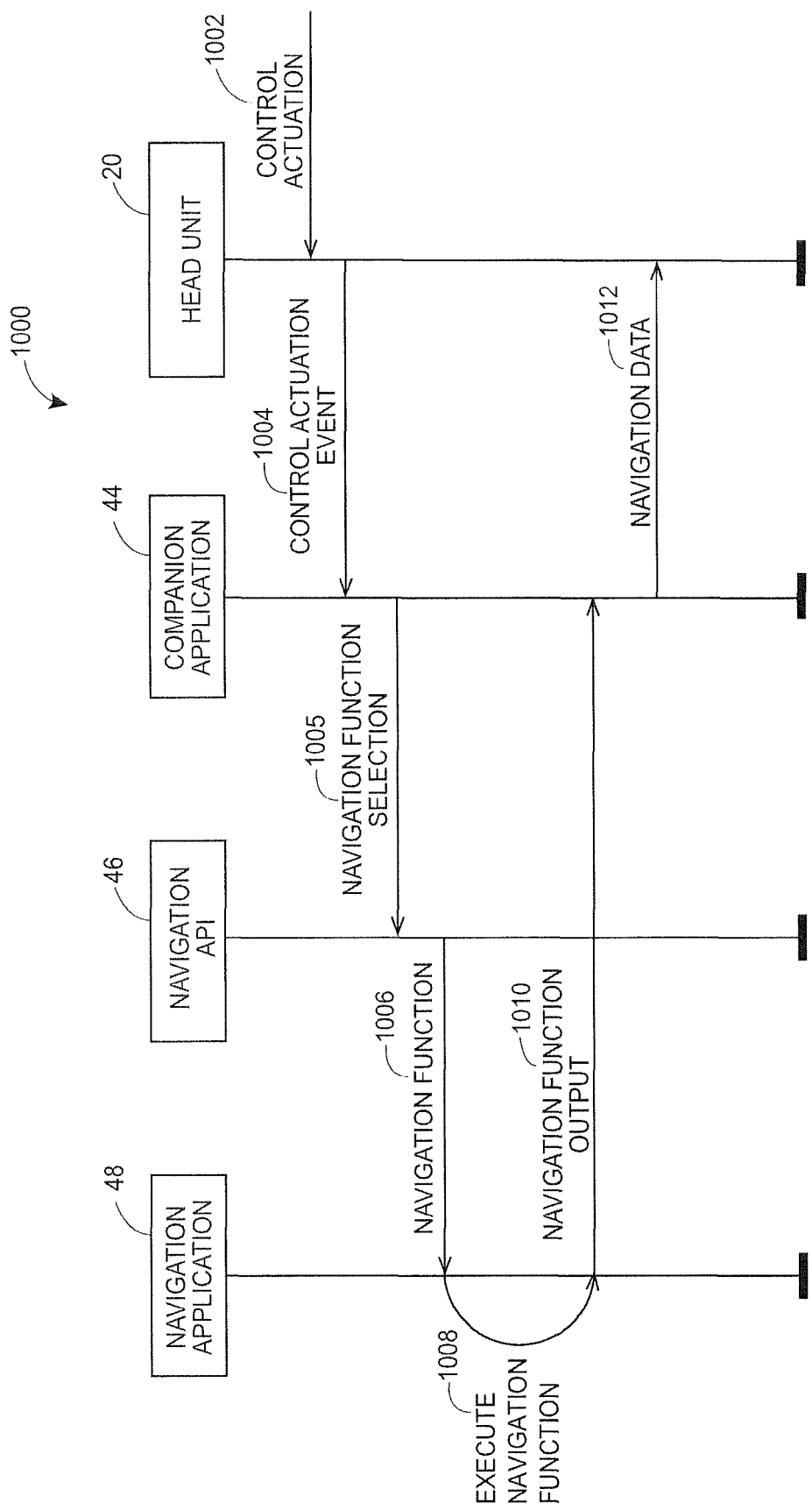
FIG. 10 is a message sequence diagram that illustrates an example exchange of information between the components illustrated in FIG. 2 to provide user input received via the head unit to the navigation application on the portable device.

Next, a message sequence diagram 1000 of FIG. 10 illustrates an example exchange of information between the components illustrated in FIG. 2 to provide user input received via the head unit 14 to the navigation service application 48.

As illustrated in FIG. 10, a user actuates a vehicle control (1002), such as the "next track" button on the steering wheel mapped to the "next step" navigation function. The head unit 20 reports the key press event in a control actuation event (1004) via the short-range communication link. The companion application 44 receives the control actuation event 1004, uses the previously saved configuration information to identify the navigation function, and invokes the identified navigation function via the navigation API 46 (navigation function selection 10005). To continue with the example above, the companion application 44 identifies and invokes the "next step" navigation function.

With continued reference to FIG. 10, the navigation API 46 forwards the selection to the navigation service application 48 (event 1006), which executes the function (event 1008) and provides the results of executing the selected navigation function to the companion application 44 (event 1010), to be forwarded to the head unit 20 (event 1012).

Thus, a vehicle control is mapped to a navigation functions using the configuration function of the companion application. In some implementations, the companion application 44 automatically maps one or more vehicle controls to navigation functions of the portable device 10 according to a set of predetermined rules. For example, the companion application 44 can automatically map the "volume up" or the "next track" steering wheel button to the navigation function that presents the next step in the route, map the "volume down" or the "previous track" steering wheel button to the navigation function that presents the previous step, etc.

As another alternative, a routine in the head unit 14 can conduct and store mapping between vehicle controls and navigations functions. To this end, the head unit 14 may request, via the companion application 44 (which in turn invokes the navigation API 46) that the navigation service application 48 list the available navigation functions. Alternatively, the head unit 14 can simply assume the availability of certain functions on the portable device 10. According to this embodiment, the head unit 14 reports selections of navigation functions to the companion application 44 rather than "raw" key press events.

Figure 11:
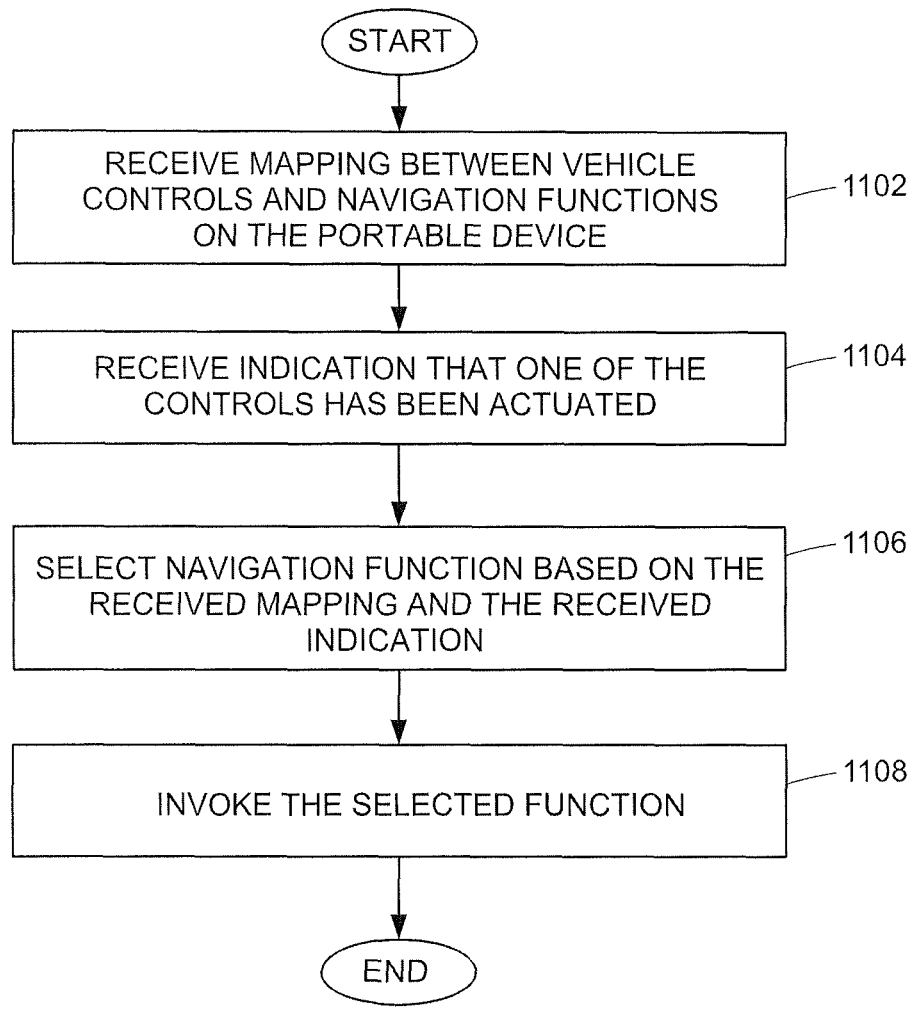
FIG. 11 is a flow diagram of an example method for processing user input received via a head unit of a vehicle in a navigation application on a portable device, which can be implemented in the portable device of FIG. 2.

For additional clarity, an example method for processing an indication of a user input from an external input device installed in a vehicle 12 is discussed with reference to FIG. 11. This method can be implemented as a set of computer-executable instructions executable on one or more processors of the portable device 10, for example, and stored in a computer readable memory.

The method begins at block 1102, where a mapping between a set of controls on the external input device and a plurality of navigation functions of a navigation service is received. Next, at block 1104, an indication that one of these controls has been actuated. At block 1106, the proper navigation function is selected from among the set of navigation functions based on the received mapping and the received indication. At block 1108, the selected navigation function is invoked. In at least some of the embodiments, an output of the navigation function is provided to the external input device. The method completes after block 1108.

Using the Suggestions Server to Process Partial User Input

In some embodiments, the navigation service of the portable device 10 also supports an "auto complete" feature to provide suggestions based on a user input that is only partially completed. This feature reduces the time the user must interact with the vehicle controls while driving. Thus, for example, when the users actuates an input corresponding to the first letter of the destination point (e.g., "M"), the head unit 14 displays or announces a suggested location that starts with that letter. The auto-complete functionality also allows the head unit 14 to make use of the long-range communication capabilities of the portable device 10 as well as the user account associated with the portable device 10. In this manner, the suggestions can be personalized for the user without requiring that the head unit 14 have a subscription to a long-range wireless service, or that the head unit 14 maintain various user accounts. Thus, a user can rent a car, borrow a car from a friend, etc. and still have access to personalized navigation data, personalized map images, and personalized suggestions.

Figure 12:
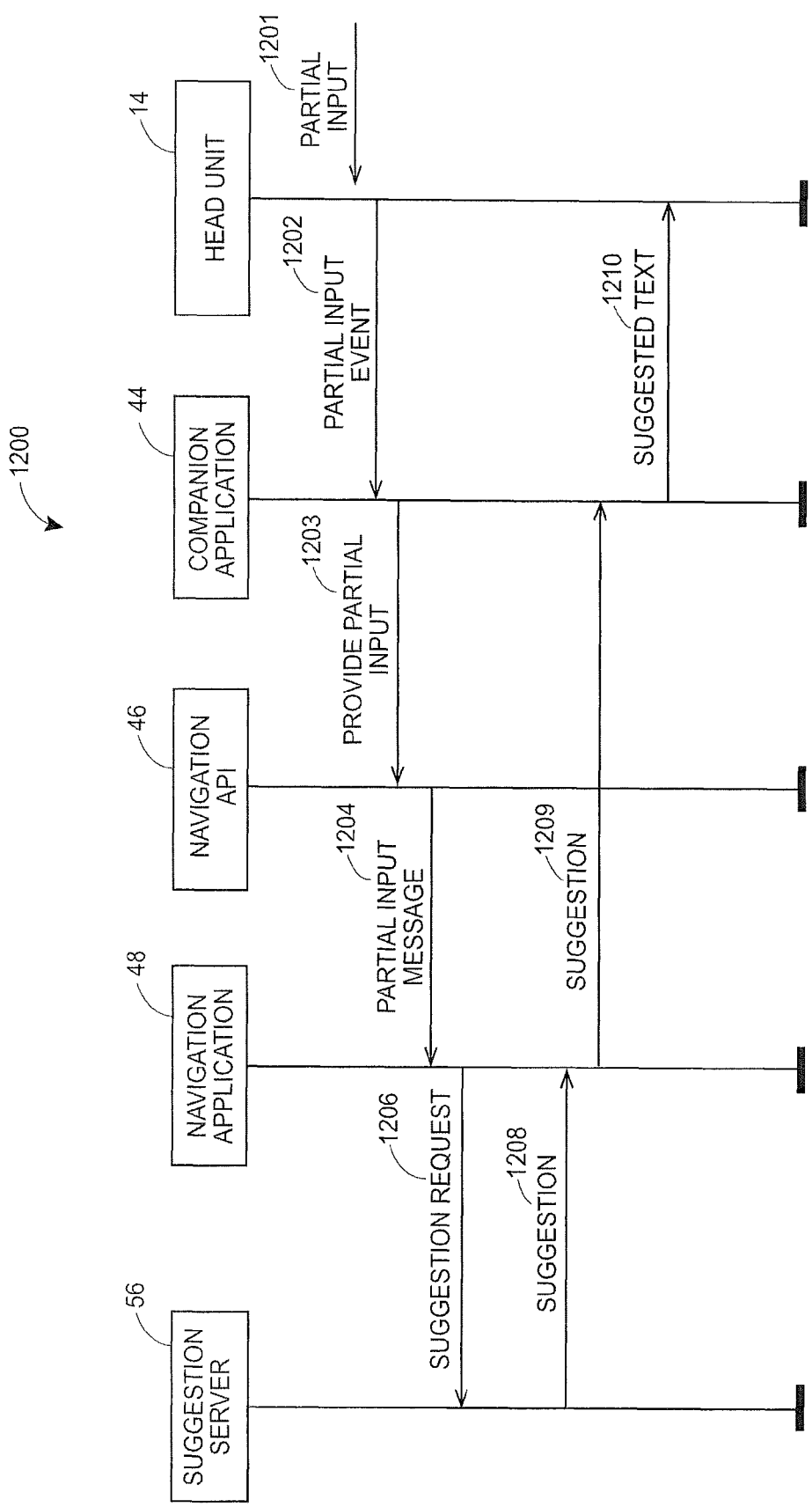
FIG. 12 is a message sequence diagram that illustrates an example exchange of information between the components illustrated in FIG. 2 to provide input suggestions to the head unit.

FIG. 12 is a message sequence diagram that illustrates an example information exchange 1200 between the components illustrated in FIG. 2 to provide input suggestions to the head unit 14. According to this scenario, the head unit 14 receives partial input (event 1201) which may include as little as one letter or multiple letters, depending on the scenario. In some embodiments of the head unit 14, the software executing on the head unit 14 presents a dialogue to request the destination via the display or asks for the user input via the audio components.

The head unit 14 transmits the partial input event 1202 to the companion application 44 via the short-range communication link. The companion application 44 then invokes the navigation API 46 to structure the partial input so as conform to a format supported by the navigation service application 48. The navigation API 46 then transmits a partial input message 1204 to the navigation application 48, which in turn transmits a suggestions request 1206 to the suggestions server 56 via the long-range communication link. Once the suggestions server 56 responds with one or several suggestions 1208, the navigation application 48 provides the suggestions to the companion application 44 (suggestions event 1209), and the companion application transmits the suggestion to the head unit 14 (suggested text message 1210). In particular, the companion application 44 can convert the received suggestion to a format supported by the head unit 14. This format can specify text, audio, etc.

In some embodiments, the navigation application 48 and/or the suggestion server 56 personalize the suggestion based on the user account and/or location history of the portable device 10.

The process is continued and/or repeated as the head unit 14 continues to receive input. For example, the head unit 14 can transmit a first partial input (first letter of the destination) to the companion application 44, a second partial input (first two letters of the destination) to the companion application 44, etc., until the destination has been confirmed or completely entered by the user.

In some embodiments, the portable device 10 has a sufficient cache of suggestions stored in the memory 38 and the auto-suggest functionality is used when the portable device 10 is unable to communicate with the suggestion server 56. The navigation service application 48 in this case receives the partial input and generates a suggestion output based on the suggestions saved in the cache.

Further, in some embodiments, the navigation application 48 generates a suggestion before the head unit 14 receives any input. For example, the account associated with the portable device 10 can include location history indicating that when the vehicle 12 is at the airport in Sydney, the user typically drives home. Thus, the navigation application 48 can suggest the user's home location in response to the user activation navigation functionality via the head unit 14.

Figure 13:
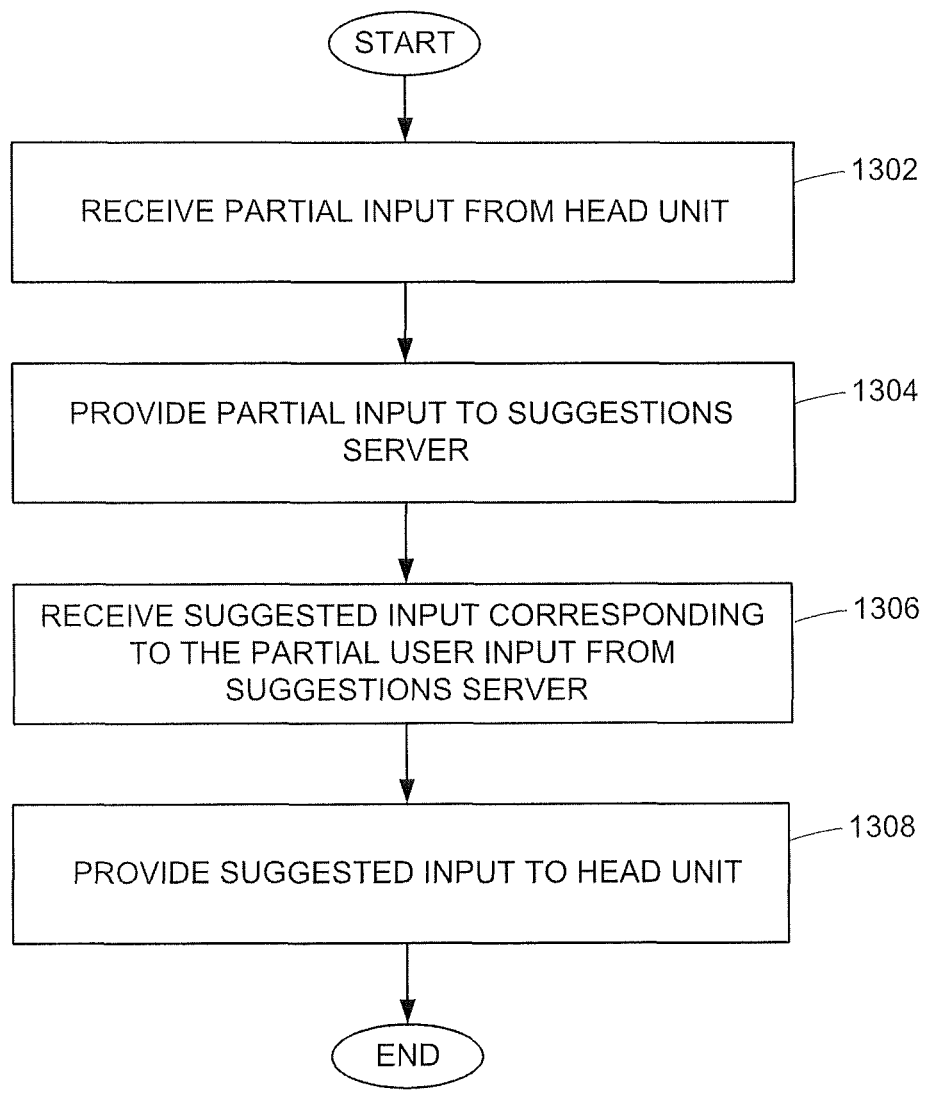
FIG. 13 is a flow diagram of an example method for providing input suggestions for requesting navigation data via a head unit of a vehicle, which can be implemented in the portable device of FIG. 2.

For additional clarity, an example method for providing input suggestions via the head unit 14 is discussed with reference to FIG. 13. This method can be implemented as a set of computer-executable instructions and stored in a computer readable memory. In an example implementation, the method of FIG. 13 is implemented in the navigation API 46. More generally, the method of FIG. 13 can be implemented in a portable device or in any suitable computing device.

The method begins at block 1302, where partial user input is received from the head unit 14 via a first communication link. Next, at block 1304, a partial user input is provided to a suggestions server via a second communication link. At block 1306, a suggested input corresponding to the partial user input from the suggestions server is received via the second communication link. At block 1308, the suggested input is provided to the head unit 14 via the first communication link. The method completes after block 1308.

Additional Considerations

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Additionally, certain embodiments are described herein as including logic or a number of components, modules, or mechanisms. Modules may constitute either software modules (e.g., code stored on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

A hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module in dedicated and permanently configured circuitry or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as an SaaS. For example, as indicated above, at least some of the operations may be performed by a group of computers (as examples of machines including processors), these operations being accessible via a network (e.g., the Internet) and via one or more appropriate interfaces (e.g., APIs).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" or a "routine" is a self-consistent sequence of operations or similar processing leading to a desired result. In this context, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Upon reading this disclosure, those of skill in the art will appreciate still additional alternative structural and functional designs for a navigation API through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method in a portable device for providing input suggestions for requesting navigation data via a head unit of a vehicle, the method comprising:
receiving, via a short-range communication link, partial user input provided to the head unit, wherein the partial user input includes a sequence of alphanumeric characters;
transmitting the partial user input to a suggestions server via a long-range communication link;
receiving a set of suggestions via the long-range communication link;
generating, by one or more processors, suggested input corresponding to the partial user input, based on the set of suggestions, wherein the suggested input includes the sequence of alphanumeric characters and one or more additional characters, and wherein the suggested input corresponds to a set of one or more geographic locations; and
providing, by the one or more processors, the suggested input to the head unit via the short-range communication link.

2. The method of claim 1, wherein providing the suggested input to the head unit includes:
receiving the set of suggestions from the suggestions in a first format, and
causing the set of suggestions to be converted to the second format specific to the head unit to generate the suggested input.

3. The method of claim 1, wherein the set of one or more geographic locations includes a plurality of geographic locations, the method further comprising:
receiving, from the head unit via the short-range communication link, a selection of one of the plurality of geographic locations, and
generating navigation directions from a current location of the vehicle to the selected geographic location.

4. The method of claim 1, wherein providing the suggested input to the head unit includes generating audio announcements for the one or more names of geographic locations.

5. The method of claim 1, wherein the suggested input is personalized for a user of the portable device.

6. A portable device comprising:
one or more processors;
a first network interface to communicate with a head unit of a vehicle via a first communication link;
a second network interface to communicate with a suggestions server via a second communication link; and
a non-transitory computer-readable medium storing thereon instructions that, when executed by the one or more processors, cause the portable device to:
receive, via the first communication link, partial user input provided to the head unit,
cause the partial user input to be transmitted to the suggestions server,
receive a set of suggestions from the suggestions server,
generate suggested input based on the set of suggestions, and
cause the suggested input to be transmitted to the head unit.

7. The portable device of claim 6, wherein the set of suggestions received from the suggestions server conforms to a first format, wherein the suggested input transmitted to head unit conforms to a second format, and wherein the instructions further cause the portable device to convert the set of suggestions from the first format to the second format to generate the suggested input.

8. The portable device of claim 7, wherein the instructions stored on the non-transitory computer-readable medium include:
a first set of instructions that implement a navigation service application that provides the partial user input to the suggestions server and receives the set of suggestions from the suggestions server, and
a second set of instructions that implement an application programming interface (API) which, when invoked by a companion application, provides the set of suggestions to the companion application for conversion to the second format.

9. The portable device of claim 8, wherein the second format is a proprietary format specific to the head unit.

10. The portable device of claim 8, wherein the navigation service application is native to an operating system.

11. The portable device of claim 6, wherein the partial user input includes a sequence of alphanumeric characters consistent with a plurality of geographic locations, and wherein the suggested input includes names of the plurality of geographic locations.

12. The portable device of claim 11, wherein the instructions further cause the portable device to:
provide the names of the plurality of geographic locations to the head unit,
receive a selection of one of the plurality of geographic locations, and
generate navigation directions to the selected geographic location.

13. The portable device of claim 6, wherein to cause the suggested input to be transmitted to the head unit, the instructions cause the portable device to:
generate an audio announcement based on the received suggested input, and
provide the generated audio announcement to the head unit.

14. The portable device of claim 6, wherein the instructions further cause the portable device to personalize for a user of the portable device.

15. The portable device of claim 6, wherein:
the first network interface is a short-range communication interface, and
the second network interface is a long-rage communication interface.

16. A non-transitory computer-readable medium storing thereon a plurality of instructions that implement an application programming interface (API) for use by a software application executing on a portable device, wherein the API, when invoked by the software application, is configured to:
receive partial user input from an external device operating independently of the portable device, via a first communication link;
provide the partial user input to a suggestions server via a second communication link;
receive, from the suggestions server, one or more suggestions that correspond to a set of one or more geographic locations;

generate suggested input based on the one or more suggestions, and provide the suggested input to the external device.

17. The computer-readable medium of claim 16, wherein the partial user input includes a sequence of alphanumeric characters, and wherein each geographic location included in the one or more suggestions includes the sequence of alphanumeric characters and one or more additional characters in its name.

18. The computer-readable medium of claim 17, wherein the API is further configured to:

receive the one or more suggestions from the suggestions server in an alphanumeric format, and generate an audio announcement based on the one or more suggestions to generate the suggested input.

19. The computer-readable medium of claim 16, wherein the API further causes the one or more suggestions to be personalized for the user of the portable device.

\* \* \* \* \*